Aug. 4, 1953  L. C. BRUNSTRUM  2,647,807
NONFRETTING ANTIFRICTION BEARING
Filed June 30, 1951

INVENTOR.
Lawrence C. Brunstrum
BY
Everett A. Johnson
ATTORNEY

Patented Aug. 4, 1953

2,647,807

UNITED STATES PATENT OFFICE 2,647,807

NONFRETTING ANTIFRICTION BEARING

Lawrence C. Brunstrum, Flossmoor, Ill., assignor to Standard Oil Company, Chicago, Ill., a corporation of Indiana Application June 30, 1951, Serial No. 234,585

9 Claims. (Cl. 308—183)

This invention relates to an antifriction bearing and more particularly to a bearing oscillated through a small arc in service.

One of the major antifriction bearing problems is fretting corrosion, variously called friction oxidation and false brinelling. This type of corrosion is very rapid and occurs in bearings subjected to slight oscillatory motions, and has become of increasing importance in aircraft and aircraft accessories in operation of control surface hinge points, engine controls, and aircraft instrumentation. Ball, roller, or needle bearings are all the victims of this troublesome phenomenon which can only be mitigated to a minor degree by known lubricants and known lubrication means.

The difficulty develops in bearings subjected to small arc travel and usually in bearings where the service is a small angle of less than about 90 degrees. For example, control bearings on aircraft frequently are turned through small angles and in such service conventional bearings have very short life because of the pitting of the races in the small areas in contact with the balls or rollers during service. Selsyn systems are particularly troublesome because of the tendency of such systems to hunt slightly at all times. This hunting results in short-arc oscillations which cause rapid and severe fretting corrosion.

It is therefore an object of my invention to provide a novel antifriction bearing assembly which includes separate groups of bearing members arranged to travel unidirectionally for a given rotation of the bearing assembly. A further object of the invention is to provide an antifriction bearing assembly which is adapted to track completely over the races with which each bearing member is in contact. A further object is to provide a rugged bearing assembly which is resistant to fretting corrosion and adapted for use in devices which have elements oscillated through a small arc. Still another object of my invention is to provide a non-fretting bearing assembly which can be lubricated with known lubricants and by known lubrication methods. An additional object of my invention is to provide a bearing which has increased bearing life and avoids the necessity for frequent replacement. These and other objects of my invention will become apparent as the description thereof proceeds.

Briefly, my non-fretting antifriction bearing comprises three rings instead of the conventional two, confining two concentrically arranged rows of ball or roller bearing members instead of only one. Means is provided to insure unidirectional but opposite direction of travel of each of the twin rows, and any means can be used which prevents one retainer and its row of bearing members from traveling in more than one direction. The desired unidirectional travel of a given row may be obtained by a restraining means such as a ratchet or similar positive mechanical means between rings or between a ring and retainer, or by a frictional device acting between these parts. When such a bearing is operated in oscillatory service, shaft rotation in one direction is borne on a first row (the other being restrained) whereas shaft rotation in the opposite direction is borne on the other row (the first row being restrained).

Additional details of my invention will be described in connection with the description of the accompanying drawings which form a part of this specification, and wherein.

The invention applies whether the bearing is of the radially or axially loaded type and embodiments of the invention will be described with reference to both types of bearing assemblies.

Figure 1:
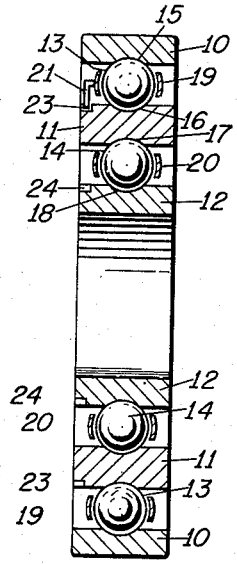
Figure 1 is a sectional view of a radial ball bearing assembly constructed according to my invention.
Figure 2:
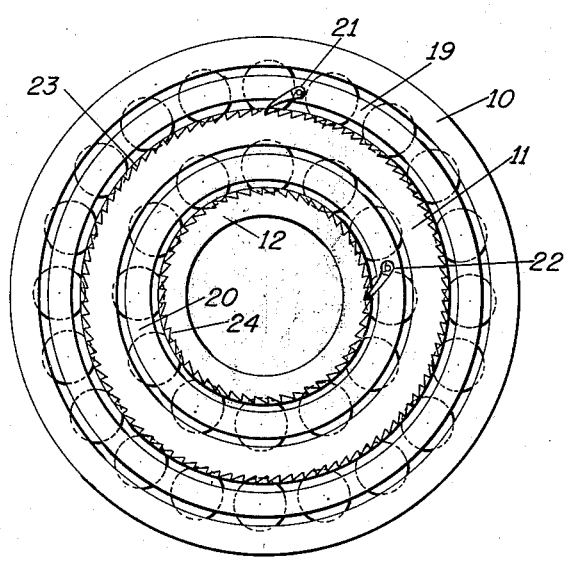
Figure 2 is an elevation of the bearing of Figure 1.
Figure 3:
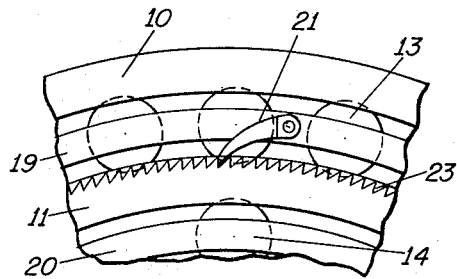
Figure 3 is an enlarged fragmentary view showing the restraining means of the assembly in Figures 1 and 2.

In Figures 1, 2 and 3 of the drawing, the bearing comprises an outer bearing ring 10, an intermediate or center ring 11, and an inner bearing ring 12. Antifriction bearing members, which may be rows of balls 13 and 14, are interposed rings 10—11 and 11—12, respectively, and run in the raceways 15—16 and 17—18. The groups of balls 13 and 14 are held within cages 19 and 20. One set of balls and cage turns in only one direction and the other set turns in only the other direction, the direction of travel being controlled by a unidirectional restraining means.

In the drawings, the restraining means comprises a ratchet and rack means. In Figures 1, 2, and 3, the ratchet means 21 and 22 are shown as extending from the cage 19 to a rack 23 on the center ring 11 and from cage 20 to a rack 24 on the inner bearing ring 12, respectively. The racks 23 and 24 on the edges of the center ring 11 and the inner ring 12 may be provided by a milled groove or formed in any other suitable manner. Also, if desired, the ratchets 21 and 22 may be fixed to a bearing ring and cooperate with a rack means on a second or adjacent bearing ring.

Other means of effecting relatively opposite travel of the inner and center rings 11 and 12 may be provided; for example, it is contemplated that a sprag can be assembled within either or both of the bearing groups 13 and 14 so as to provide a positive unidirectional and counter-clockwise rotation, respectively. Likewise, it is possible to assure rotation of the cages 19 and 20 or the rings 10 and 12 with respect to the inner bearing ring 11 by providing an annular and oppositely notched plate which may be fixed to the side of the bearing. The oppositely directed notches provide a ratchet means which resiliently contacts the edges of the cages 19 and 20 or the edges of rings 10 and 12. In addition, the lubricant seal may be employed to insure only unidirectional rotation of a given ring by providing more resistance to rotation in one direction than the other.

Figure 4:
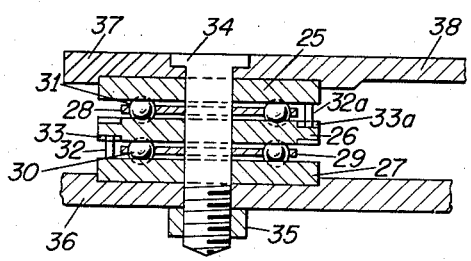
Figure 4 is a sectional view showing another embodiment of my invention applied to a thrust bearing means.

Figure 4 shows an axial thrust bearing assembly wherein the rings are rotated oppositely. In this embodiment, the bearing is formed of three flat race plates or rings 25, 26 and 27. Cage plates 28 and 29 retain the ball bearings 30 and 31, with ratchet means 32 extending between bottom race plate 27 and rack 33 on intermediate race plate 26 and ratchet 32a between the upper race ring 25 and rack 33a on ring 26. The racks 33 and 33a may comprise milled grooves.

Figure 5:
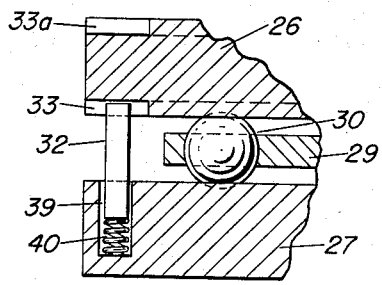
Figure 5 is an enlarged fragmentary view of the restraining means of the embodiment illustrated in Figure 4.

Figure 5 shows details of one form of restraining means including ratchet 32 held by spring 40 in chamber 39 against the rack 33. Normally the lower portion or plate 27 of the bearing assembly tends to remain motionless. Thus when the ratchet 32 slips, the lower row of balls 30 in the bearing will roll on ring 26 which is held by ratchet 32a and rack 33a. When 38 travels in the reverse direction, the ratchet 32 drives the center race plate 26 and forces the upper balls 31 to roll. Thus each set of balls 30 and 31 rolls intermittently in opposite directions over their complete paths between the rings.

A device of this type has been run for twenty hours with a 300 viscosity soda soap grease with a thrust load of 450 pounds at room temperature. A conventional bearing was simultaneously loaded and run. Although fretting corrosion occurred in the conventional bearing, there was none in the bearing constructed according to this invention. The test was repeated with a 135 viscosity synthetic oil lithium grease. The grease was badly oxidized and the races on the conventional bearing were deeply pitted and the balls were seriously damaged. However, the bearing, according to this invention, was in good condition and the grease was not oxidized. It is apparent, therefore, that by providing complete race travel for the antifriction bearing elements, conventional lubricants and lubrication techniques can be used in short arc oscillations of the journaled elements. On the other hand, operating under similar conditions, a conventional roller bearing is seriously damaged and in some unexplained manner even causes the lubricant to become oxidized and accelerate the failure of the bearing assembly.

From the above, it is apparent that I have attained the objects of my invention and have provided a novel antifriction bearing assembly which permits conventional lubricants and lubrication techniques to be used on bearing assemblies in service where there is a short arc oscillation.

Although preferred forms of the invention have been described in some detail, it is to be understood that this is by way of illustration only and that changes may be made by those skilled in the art within the scope of the invention in view of my description given above.

I claim:

1. An antifriction bearing assembly including a first outer bearing ring, a second inner bearing ring, and an intermediate third bearing ring, said rings being concentric, antifriction bearing members interposed said first and third rings and said second and third rings, and ratchet means adapted to allow only unidirectional rotation of each said interposed antifriction bearing members oppositely relative to each other member.

2. An antifriction bearing assembly adapted for service in short oscillating arcs of less than 90 degrees which comprises in combination a plurality of concentric race rings, antifriction bearing members interposed adjacent race rings, and a unidirectional restraining means adapted to effect unidirectional rotation of each antifriction bearing member alternately and oppositely with respect to each other.

3. An antifriction bearing assembly including an inner race ring, an outer race ring, and an intermediate race ring, antifriction bearing members interposed said inner and intermediate race rings and said outer and intermediate race rings, respectively, a rack on at least one of said race rings, and a ratchet means carried by said assembly cooperating with said rack for rotating at least one of said rings with respect to another of said race rings.

4. An antifriction bearing means comprising at least three aligned race rings, antifriction bearing members arranged between adjacent race rings, a cage means for retaining said antifriction bearing means between said adjacent race rings, ratchet means carried by at least one of said cage means, and a rack means on an adjacent race ring adapted to engage said ratchet means.

5. An antifriction bearing assembly adapted for service in short oscillating arcs of less than 90 degrees which comprises in combination a plurality of race rings, antifriction bearing members interposed adjacent race rings, and a unidirectional stop means carried by relatively movable portions of said assembly and adapted to effect relative rotation of adjacent groups of antifriction bearing members alternately and oppositely with respect to each other.

6. An antifriction bearing assembly which comprises a first annular race ring, a second concentric annular race ring, and a third concentric annular race ring interposed said first and second race rings, raceways on the inner surface of said first race ring, on the outer surface of said second race ring, and on both surfaces of said third race ring, a group of ball bearings running in each of said raceways, a bearing cage retainer for each group of ball bearings interposed said first and third and second and third race rings, a rack means on said third race ring, and a ratchet means carried by at least one of said cage retainers engaging said rack means.

7. An antifriction bearing means comprising at least three aligned race rings, antifriction bearing members arranged between said adjacent race rings, a cage means for retaining said antifriction bearing means between said adjacent race rings, ratchet means carried by at least one of said cage means comprising a flexible leaf having one end fixed to said cage, and a rack means comprising a milled groove on the edge of an adjacent race ring adapted to be engaged by said ratchet means.

8. An antifriction bearing assembly adapted for service in oscillating arcs of less than 90 degrees which comprises in combination a plurality of race rings, antifriction bearing members interposed adjacent race rings, and a unidirectional stop means carried by said assembly and adapted to effect relative rotation of adjacent groups of antifriction bearing members alternately and oppositely with respect to each other, said unidirectional stop means comprising a ratchet carried by a retainer for said antifriction bearing members cooperating with a rack means carried by an adjacent race ring.

9. An antifriction bearing assembly adapted for service in short oscillating arcs of less than 90 degrees including a first race ring, and a second race ring, and an intermediate race ring, antifriction bearing members interposed said first and intermediate race rings and said second and intermediate race rings respectively, a rack means on opposite faces of said intermediate race ring, and ratchet means carried by said first race ring and by said second race ring each cooperating with one of said rack means on said intermediate race ring for rotating said intermediate race ring alternately and unidirectionally.

LAWRENCE C. BRUNSTRUM.

References Cited in the file of this patent

UNITED STATES PATENTS

| Number | Name | Date |
|---|---|---|
| 1,574,470 | Coffee | Feb. 23, 1926 |
| 2,030,953 | Gemeny | Feb. 18, 1936 |
| 2,453,291 | Wilford | Nov. 9, 1948 |
| 2,502,986 | Phillips | Apr. 4, 1950 |